(12) United States Patent
Peng

(10) Patent No.: US 6,851,740 B1
(45) Date of Patent: Feb. 8, 2005

(54) AUTOMOTIVE VEHICLE WITH LATERAL IMPACT SEAT DISPLACEMENT SYSTEM

(75) Inventor: James Zheng Peng, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/605,771

(22) Filed: Oct. 24, 2003

(51) Int. Cl.[7] .............................................. B62D 27/02
(52) U.S. Cl. .............................. 296/187.12; 296/68.1; 296/187.02
(58) Field of Search ................... 296/187.05, 193.02, 296/187.12, 187.02, 187.03, 146, 6, 68.1

(56) References Cited

U.S. PATENT DOCUMENTS

| | | | | |
|---|---|---|---|---|
| 4,272,103 A | | 6/1981 | Schmid et al. | |
| 4,934,751 A | * | 6/1990 | Shimoda ................... | 296/203.3 |
| 5,000,509 A | | 3/1991 | Sinnhuber et al. | |
| 5,306,066 A | * | 4/1994 | Saathoff ................... | 296/146.6 |
| 5,328,234 A | * | 7/1994 | Daniel et al. .......... | 297/216.16 |
| 5,395,135 A | | 3/1995 | Lim et al. | |
| 5,482,344 A | | 1/1996 | Walker et al. | |
| 5,542,738 A | * | 8/1996 | Walker et al. ......... | 296/187.05 |
| 5,588,692 A | * | 12/1996 | Gandhi et al. ........... | 296/146.7 |
| 5,603,548 A | * | 2/1997 | Gandhi et al. ........... | 296/146.7 |
| 5,707,098 A | * | 1/1998 | Uchida et al. ........... | 296/146.6 |
| 5,716,093 A | * | 2/1998 | Sadr ........................ | 296/146.6 |
| 5,749,600 A | * | 5/1998 | Yamada et al. ............. | 280/751 |
| 5,857,702 A | | 1/1999 | Suga et al. | |
| 5,984,402 A | | 11/1999 | Takeuchi | |
| 6,203,096 B1 | * | 3/2001 | Noda et al. .............. | 296/146.6 |
| 6,207,244 B1 | * | 3/2001 | Hesch ....................... | 428/35.9 |
| 6,237,987 B1 | * | 5/2001 | Babatz et al. ............ | 296/146.6 |
| 6,299,238 B1 | * | 10/2001 | Takagi et al. .......... | 296/187.12 |
| 6,299,239 B1 | * | 10/2001 | Sagawa et al. ........ | 296/187.12 |
| 6,688,671 B2 | * | 2/2004 | Fukutomi ................ | 296/146.6 |
| 2002/0113462 A1 | * | 8/2002 | Heranney ................... | 296/189 |
| 2002/0158486 A1 | * | 10/2002 | Dauvergne et al. ...... | 296/146.6 |

* cited by examiner

Primary Examiner—Joseph D. Pape
(74) Attorney, Agent, or Firm—Ford Global Technologies, LLC

(57) ABSTRACT

An automotive vehicle having a passenger cabin includes a floorpan with seats mounted to the floorpan. Side closure structures adjoin the outboard ends of the seats. Seat displacement members located within the side closure structures load the outboard ends of the seats so as to deform the seat frames and floorpan. This moves the affected seat laterally inward with respect to a longitudinal center plane of the vehicle in the event of a laterally directed impact load against the closure structure. As a result, the pelvic region of the occupant will be the first region of the occupant to be dynamically loaded by the side closure structure.

19 Claims, 3 Drawing Sheets

*Figure 3*
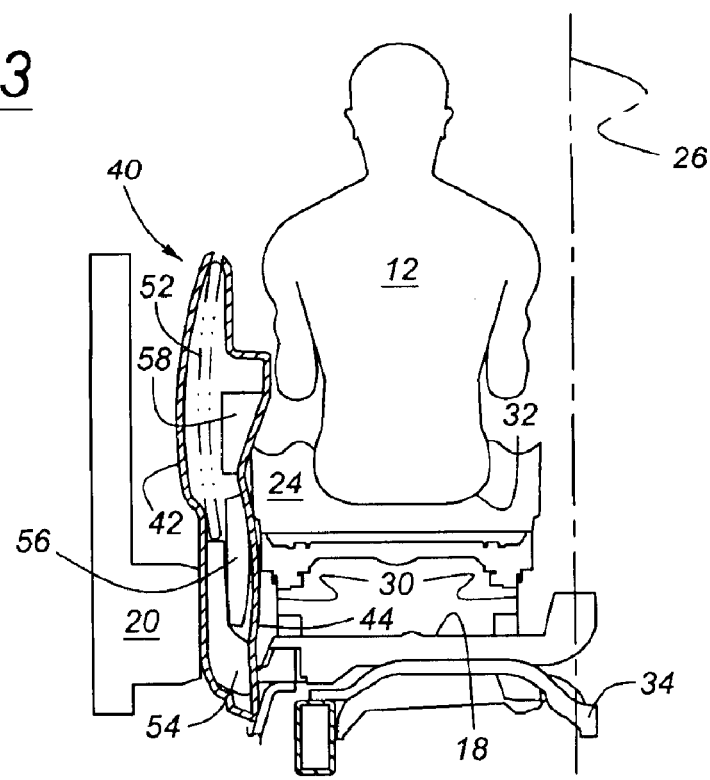
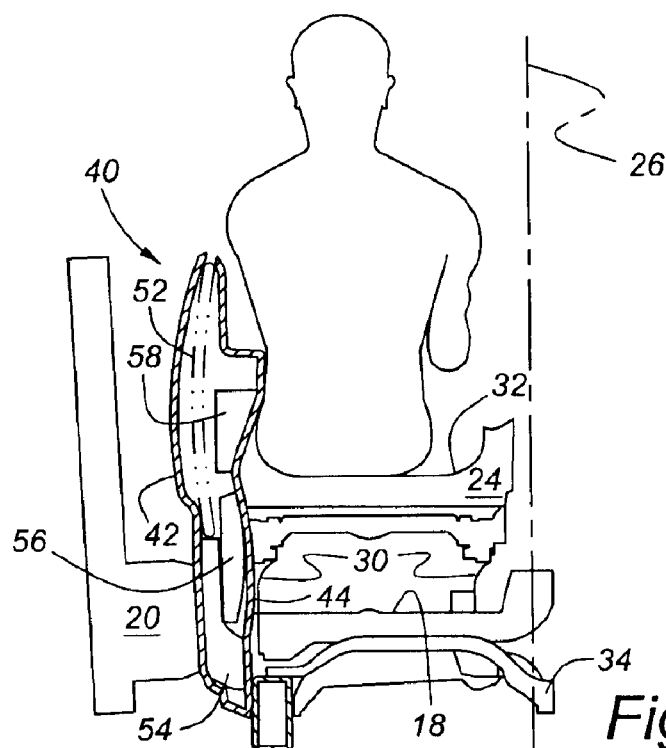
*Figure 4*

AUTOMOTIVE VEHICLE WITH LATERAL IMPACT SEAT DISPLACEMENT SYSTEM

BACKGROUND OF INVENTION

1. Field of the Invention

The present invention relates to a automotive vehicle in which a side impact upon the passenger compartment is managed by using a portion of the impact load to move the occupant seat laterally with respect to vehicle's body.

2. Disclosure Information

As the requirements related to automotive side impact testing have become increasingly more stringent, the design issues needed to be addressed by vehicle designers have become corresponding more demanding. One technical problem deals with the need to reinvent vehicle side structures at a reasonable cost, using designs that are effective. The present invention includes a seat displacement or pusher system including multiple blocks or brackets constructed of metallic or non-metallic materials such as resin, foams or honeycomb, which may be inserted in the vehicle door in alignment with the seats. The inventive seat displacement system in effect pushes the vehicle seats inboard in an event of an impact to then allow a pelvis pusher or lower portion of the interior trim of the door to push the occupant laterally by engaging the pelvic area of the passenger. This results in acceleration of the occupant as early as possible in a lateral direction with displacement force applied to the pelvic region.

Traditional side impact barrier systems have focused upon on the reinforcement of vehicle structures such as the B-Pillar, rocker panels, door beams, floorpan etc. Although reinforcement of these structures has provided some benefit, test conditions are migrating to the use of higher and heavier test barriers. In essence, a point has generally been reached at which the increasing cost and weight devoted to side impact resistant structures are yielding fewer benefits because the impact forces to which such structures are subject are so profound as to overwhelm small design changes. For example, even with major changes to the floorpan of a vehicle, the ubiquitous center tunnel prevents the floorpan from exhibiting the column strength to the extent required to overcome or to compensate for increased forces expected with currently projected testing methods.

U.S. Pat. No. 5,000,509 discloses a system which attempts to handle lateral intrusion resulting from side impact by strengthening the platforms upon which the seats are mounted as well as the tunnel area of the floorpan, so as to react against a lateral load by a column comprising two seat bases and the tunnel-area floorpan. This design of the '509 patent illustrates prior thinking on crash management which will be ineffective given the newer test requirement, because the design of the '509 patent will not allow the seat to be pushed out of the way so as to permit the occupant of the seat to be contacted first in the pelvic region.

SUMMARY OF INVENTION

An automotive vehicle includes a passenger cabin being generally symmetrical about a longitudinal center plane and a floorpan defining a lower structural surface of the passenger cabin. A first seat is mounted to the floorpan upon a seat frame and riser with the seat extending laterally across at least a portion of the passenger cabin, with the seat having a frame and an outboard end. A side closure structure adjoins the outboard end of the seat. A seat displacement member, located within the side closure structure, is adapted to impact the outboard end of the seat, so as to deform the seat frame and the floorpan, which moves the seat laterally inward with respect to the longitudinal center plane of the vehicle in the event of a laterally directed impact load against the closure structure. This will cause the pelvic region of an occupant of the seat to be the first region of the occupant to be dynamically loaded by the side closure structure. In certain cases, this may means that the pelvic region of the occupant of the seat is the first portion of the occupant's body to be contacted by the side closure structure.

According to another aspect of the present invention, an automobile preferably comprises a second seat extending laterally across a portion of the cabin not occupied by the first seat, with the first and second seat being separated laterally such that displacement of the first seat resulting from an impact by the seat displacement member upon the first seat will cause the first seat to move laterally closer to the second seat.

One aspect of the present seat displacement member is its function to prevent the inner and outer panels of a closure structure, which may comprise either a door or a quarter panel, from collapsing upon one another in the region of the seat displacement member.

A seat displacement member according to the present invention preferably comprises a rigid block-like structure operatively attached to at least one exterior panel of the side closure structure. Accordingly, the seat displacement member may include a metallic or non-metallic block, or, in another preferred embodiment, a plurality of blocks with a window glass clearance space extending between inboard and outboard blocks.

According to another aspect of the present invention, an automotive vehicle may include not only a seat displacement member, but also a pelvis pusher block mounted within the closure structure above the location of the seat displacement member.

According to another aspect of the present invention, a method for managing an impact load directed laterally against the passenger compartment of an automotive vehicle includes the sequential steps of reacting initially to the impact load by permitting partial deformation of a side closure structure having inner and outer panels, while preventing the side closure structure from collapsing internally; laterally displacing an occupant seat located within the passenger compartment by impact loading the seat with a seat displacement member extending between the partially deformed inner and outer panels of said side closure structure; and, causing an initial dynamic loading of an occupant of the seat by contacting the pelvic region of the occupant with the partially deformed inner panel of the side closure structure. The occupant is preferably contacted by a portion of the inner panel which is located above the portion of the inner panel which contacts the seat during lateral displacement of the seat.

It is an advantage of the present invention that the occupant of the vehicle will be moved laterally inward by loading the occupant's pelvic region first, rather than by loading a higher region of the occupant's body.

It is a further advantage of the present invention that the present seat displacement member will allow the occupant seat of a vehicle to be moved laterally inboard during a side impact, so as to allow the occupant's pelvis to be contacted by a pelvis pusher installed as part of side closure structure to which the seat displacement member is mounted.

Other advantages, as well as objects and features of the present invention, will become apparent to the reader of this specification.

BRIEF DESCRIPTION OF DRAWINGS

FIG. 3 is similar to FIG. 2 but shows an impact barrier as having partially collapsed a door having seat displacement members according to the present invention.

FIG. 4 is similar to FIGS. 2 and 3 but shows a later point in the lateral load management sequence according to the present invention.

DETAILED DESCRIPTION

Figure 1:
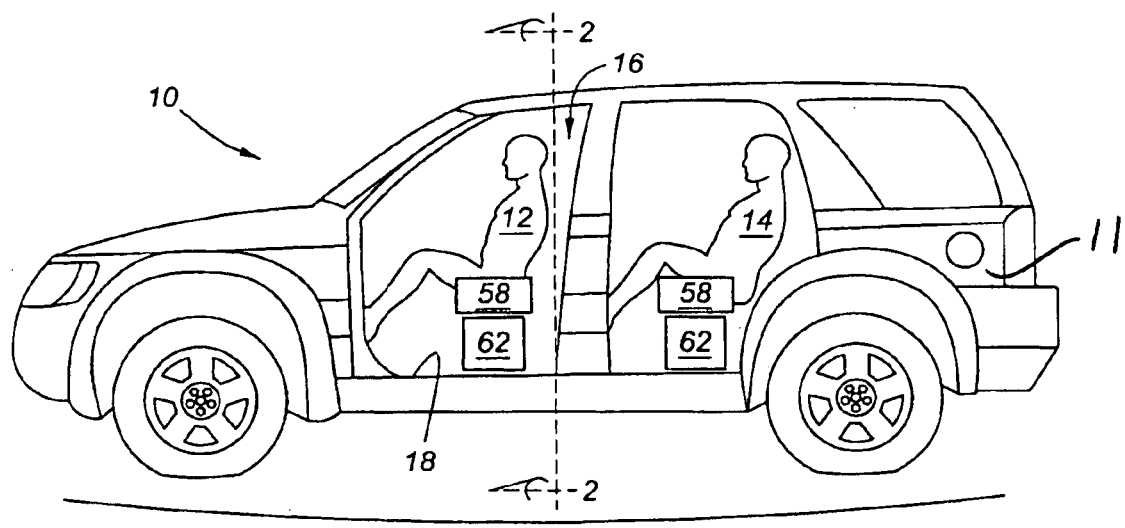
FIG. 1 is a side elevation, partially cut away, of a vehicle showing seat displacement members and pelvis pushers according to the present invention.

As shown in FIG. 1, vehicle 10 has front-end seat occupant 12 and a rear-end seat occupant 14. Passenger cabin 16 of vehicle 10 has a floorpan 18. FIG. 1 shows front and rear seat displacement members 62 which are generally shown as being rectangular. Pelvis pushers 58 are mounted above seat displacement members 62. Vehicle 10 also has quarter panel 11.

Figure 2:
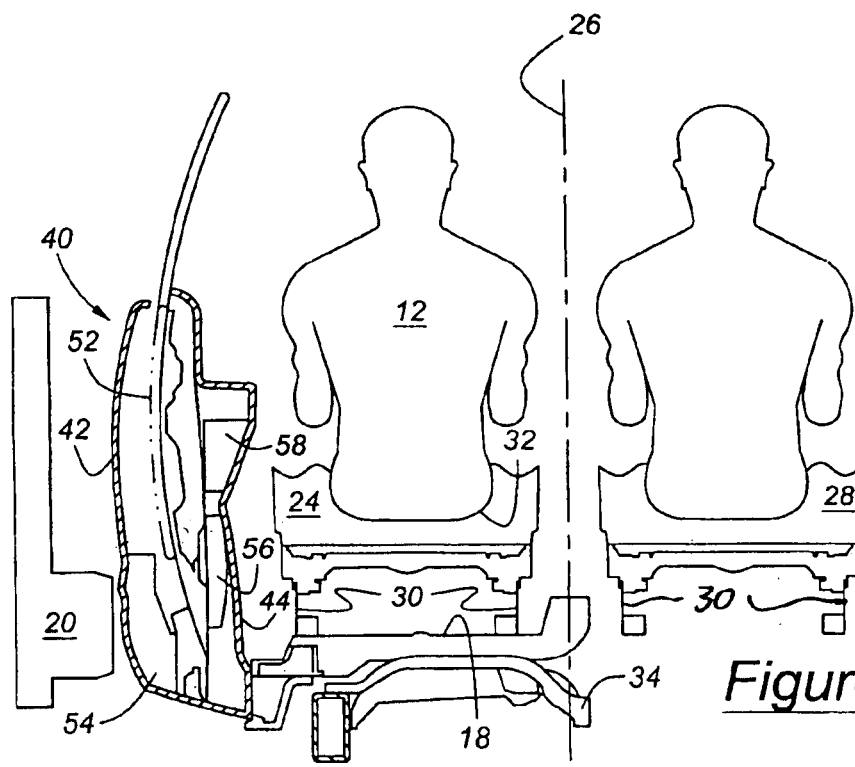
FIG. 2 is a end view, partially in section of the vehicle of FIG. 1, with the addition of a test impact barrier.

FIG. 2 shows greater detail of a 2-piece seat displacement member having an outboard member 54 and an inboard member 56. Outboard member 54 is mounted to outer panel 42 of door 40. Inboard seat displacement member 56 is mounted to inner panel 44 of door 40. Impact barrier 20 is shown as in a free state before impacting door 40. It is also noted that glass 52 occupies a clearance space between outboard seat displacement member 54 and inboard seat displacement member 56. Front seat occupant 12 is shown as being seated upon seat cushion 32 which is part of seat 24. Center plane 26 of vehicle is also shown. The vehicle further includes second seat 28. Both seats are mounted upon floorpan 18 by means of risers 30. Cross member 34 is shown as being as extending under floorpan 18 and seat 24. This cross member would also extend under seat 28. Seat displacement members 54 and 56 may comprise metallic or non-metallic blocks or brackets. The nonmetallic compositions may include resin structures or composites, including metals and other materials known to those skilled in the art and suggested by this disclosure.

FIG. 3 illustrates impact barrier 20 as having collapsed door 40 such that outer door panel 42 and inner door panel 44 have moved together in the region of outboard seat displacement member 54 and inboard seat displacement member 56. It is also noted that in FIG. 3 that the clearance space for glass 52 has been closed.

FIG. 4 illustrates a further point in the present sequence in which barrier 20 has fully closed the gap which previously existed between seat 24 and inner panel 44 of door 40. At this point, outboard seat displacement member 54 is stacked upon inboard seat displacement member 56 and the seat displacement members have begun pushing seat 24 laterally by impacting upon seat 24 and seat riser 30. Floorpan 18 has also begun to deform at this point. Although occupant 12 has in effect remained in substantially the position originally occupied vis-à-vis plane 26, seat cushion 32 has moved laterally inboard. Importantly, it is shown in FIG. 4 that the portion of inner panel 44 supported by pelvis pusher 58 has began contacting the pelvic area of occupant 12. It is thus seen from these sequences that the first portion of the occupant which is contacted by side closure structure 40 is the pelvic region of occupant 12. This is beneficial because the lower portion of the occupant's body will pull the upper portion inboard as the lateral intrusion progresses.

It should be noted that the lateral displacement of the first seat as shown in the various figures will cause the first and second seats to move closer together. Thus, it is to be understood that the present automotive vehicle is not intended to create a column loading situation between the adjacent seats 24 and 28. Rather, it is a result of the present invention that seat 24, including the seat risers and associated floorpan structure, will in effect be pushed out of the way so as to allow occupant 12 to be laterally displaced by means of a dynamic load applied by the side closure structure 40 against the pelvic region of the occupant. In effect, this comprises a method according to the present invention in which an impact load directed laterally against the passenger compartment of the vehicle is reacted initially by permitting partial deformation of the side closure structure 40, specifically outer and inner panels 42 and 44, while seat displacement members such as those shown at 54 and 56 prevent side closure structure 40 from collapsing internally.

Figure 5:
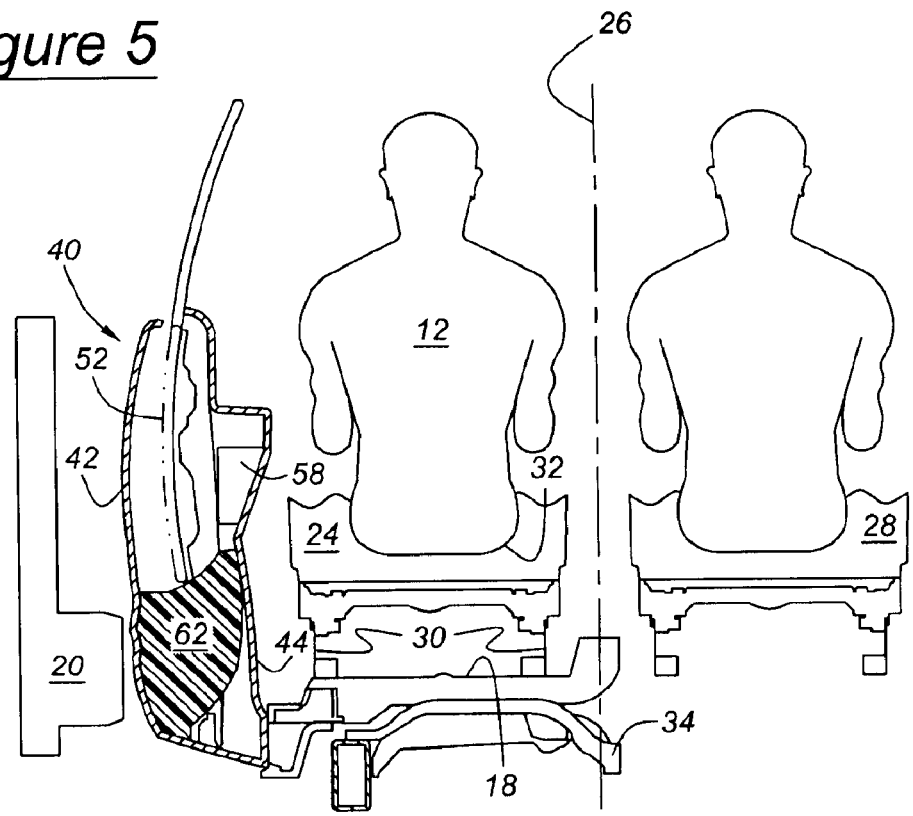
FIG. 5 illustrates a one piece seat displacement member according to another aspect of the present invention.

The function of a seat displacement member according to the present invention may be enhanced by using a unitary or one-piece member such as that illustrated in FIG. 5. Unitary seat displacement member 62 extends substantially for the entire distance defined between outer panel 42 and inner panel 44 of side closure structure 40. As noted above, side closure structure 40 may comprise either a movable door hinged about either a horizontal or a vertical axis, or a fixed structure such as a quarter panel. Similarly, as suggested by FIG. 1, the present structural system may be employed either with front or rear passenger seating area of an automotive vehicle.

In essence, the present inventive method may be viewed as a method for managing an occupant of a automotive vehicle in the event of an impact load directed laterally against the passenger compartment of the vehicle according to the steps of laterally displacing a seat occupied by the occupant without laterally displacing the occupant; by impacting the seat with a seat displacement member located within a side closure structure of the vehicle; and, following lateral displacement of seat, laterally displacing the occupant by contacting occupant in the pelvic region with an interior surface panel of the side closure structure. This interior surface panel may be backed up by the illustrated pelvis pusher 58, or may comprise a panel having suitable padding or other structures for contacting the pelvic region of an occupant.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An automotive vehicle, comprising:
    a passenger cabin being generally symmetrical about a longitudinal center plane;
    a floorpan defining a lower structural surface of said passenger cabin;
    a first seat mounted to said floorpan, with said seat extending laterally across at least a portion of said passenger cabin, with said seat having a frame and an outboard end;
    a side closure structure adjoining said outboard end of said seat; and a seat displacement member, located within said side closure structure, for impacting said outboard end of the seat, so as to deform said seat frame and move said seat laterally inward with respect to said longitudinal center plane in the event of an impact load directed laterally against said closure structure, such that the pelvic region of an occupant of said seat will be the first region of the occupant to be dynamically loaded by said side closure structure.

2. An automotive vehicle according to claim 1, wherein said seat frame comprises a seat riser interposed between a cushion portion of the seat and said floorpan.

3. An automotive vehicle according to claim 2, wherein said seat displacement member impacts upon a door inner panel which impacts upon said seat riser.

4. An automotive vehicle according to claim 2, wherein said seat displacement member impacts upon a door inner panel which impacts upon both said seat riser and an outboard end of said seat cushion.

5. An automotive vehicle according to claim 1, further comprising a second seat, extending laterally across a portion of said cabin not occupied by said first seat, with said first and second seats being separated laterally such that displacement of said first seat resulting from an impact by said seat displacement member upon said first seat will cause said first seat to move laterally closer to said second seat.

6. An automotive vehicle according to claim 1, wherein said seat displacement member further functions to prevent inner and outer panels of said closure structure from collapsing upon one another in the region of said seat displacement member in response to a laterally directed impact load.

7. An automotive vehicle according to claim 1, wherein said closure structure comprises a door.

8. An automotive vehicle according to claim 1, wherein said closure structure comprises a quarter panel.

9. An automotive vehicle according to claim 1, further comprising a pelvis pusher block mounted within said closure structure above the region in which said seat displacement member is mounted, such that a portion of said closure structure backed by said pelvis pusher block will be the first portion of said side closure structure to contact an occupant seated in said first seat.

10. An automotive vehicle, comprising:
   a passenger cabin being generally symmetrical about a longitudinal center plane;
   a floorpan defining a lower structural surface of said passenger cabin;
   a first seat mounted to said floorpan upon a riser, with said seat extending laterally across at least a portion of said passenger cabin, with said seat having a frame and an outboard end;
   a side closure structure adjoining said outboard end of said seat; and
   a seat displacement member, located within said side closure structure, for impacting said outboard end of the seat, so as to deform said seat frame and said floorpan and move said seat laterally inward with respect to said longitudinal center plane in the event of a laterally directed impact load against said closure structure, such that the pelvic region of an occupant of said seat will be the first region of the occupant to be dynamically loaded by said side closure structure.

11. An automotive vehicle according to claim 10, wherein the pelvic region of said occupant will be the first region of the occupant to be contacted by said side closure structure.

12. An automotive vehicle according to claim 10, wherein said seat displacement member comprises a rigid block-like structure operatively attached to at least one exterior panel of said side closure structure.

13. An automotive vehicle according to claim 12, wherein said seat displacement member comprises a metallic block.

14. An automotive vehicle according to claim 12, wherein said seat displacement member comprises a bracket.

15. An automotive vehicle according to claim 12, wherein said seat displacement member comprises a resin block.

16. An automotive vehicle according to claim 12, wherein said seat displacement member comprises an outboard block and an inboard block, with a window glass clearance space extending between said outboard and inboard blocks.

17. A method for managing an impact load directed laterally against the passenger compartment of an automotive vehicle, comprising the sequential steps of:
   reacting initially to said impact load by permitting partial deformation of a side closure structure having inner and outer panels, while preventing the side closure structure from collapsing internally;
   laterally displacing an occupant seat located within said passenger compartment, by impact loading the seat with a seat displacement member extending between the partially deformed inner and outer panels of said side closure structure; and
   causing an initial dynamic loading of an occupant of the seat by contacting the pelvic region of the occupant with the partially deformed inner panel of the side closure structure.

18. A method according to claim 17, wherein the occupant is contacted by a portion of the inner panel which is located above the portion of the inner panel which contacts said seat during lateral displacement of the seat.

19. A method for managing an occupant of a motor vehicle in the event of an impact load directed laterally against a passenger compartment of the vehicle, comprising the steps of:
   laterally displacing a seat occupied by said occupant, without laterally displacing said occupant, by impacting a cushion portion of the seat with a seat displacement member located within a side closure structure of said vehicle; and
   following the lateral displacement of said seat, laterally displacing the occupant by contacting the pelvic region of the occupant with an interior surface panel of said side closure structure.

* * * * *